United States Patent [19]

Smarook

[11] 3,919,445
[45] Nov. 11, 1975

[54] PROCESS FOR FORMING EXPANDED LAMINATES AND PRODUCTS

[75] Inventor: Walter H. Smarook, Somerville, N.J.

[73] Assignee: Union Carbide Corporation, New York, N.Y.

[22] Filed: Dec. 26, 1973

[21] Appl. No.: 427,502

Related U.S. Application Data

[63] Continuation-in-part of Ser. No. 213,361, Dec. 29, 1971, abandoned.

[52] U.S. Cl. ............... 428/116; 264/41; 264/261; 264/275; 264/346; 425/110; 425/812; 428/119; 428/134; 428/137; 428/310
[51] Int. Cl.² ............... B29C 17/02; B32B 3/12
[58] Field of Search ... 264/41, 47, 164, 291, 210 R, 264/261, 275, 346; 425/812, 110; 65/DIG. 5, 59; 161/68, 69; 168/161

[56] References Cited
UNITED STATES PATENTS

| | | | |
|---|---|---|---|
| 2,502,304 | 3/1950 | Baker | 264/41 X |
| 2,962,409 | 11/1960 | Ludlow et al. | 264/261 X |
| 2,986,843 | 6/1961 | Loukomsky | 65/DIG. 5 |
| 3,186,813 | 6/1965 | Pfaender | 65/DIG. 5 |
| 3,215,583 | 11/1965 | Holme | 161/53 |
| 3,277,535 | 10/1966 | Rupert | 425/812 UX |
| 3,367,760 | 2/1968 | Bendig et al. | 264/291 X |
| 3,490,889 | 1/1970 | Goto et al. | 65/59 X |
| 3,708,565 | 1/1973 | Seiffert | 264/47 X |
| 3,723,224 | 3/1973 | Noguchi | 264/210 R X |

FOREIGN PATENTS OR APPLICATIONS

| | | | |
|---|---|---|---|
| 47-46782 | 11/1972 | Japan | 264/164 |
| 1,015,330 | 12/1965 | United Kingdom | 264/164 |

OTHER PUBLICATIONS

Guy, Albert G. "Elements of Physical Metallurgy." Cambridge, Mass., Addison–Wesley, 1951, pp. 41–43.
Day, Ralph K. "Glass Research Methods." Chicago, Ill., Industrial Publications, Inc., 1953, pp. 174–176; 185–187.
McLaren, A. D. "Adhesion of High Polymers to Cellulose. Influence of Structure, Polarity, and Tack Temperature." In Journal of Polymer Science, Vol. 3, No. 5, (1948), pp. 652–662.
McLaren, A. D.; T. T. Li; – Robert Rager; and H. Mark. "Adhesion IV. The Meaning of Tack Temperature." In Journal of Polymer Science, Vol. VII, No. 5, pp. 463–471 (1951).
ASTM Designation: D. 907-64a "Standard Definitions of Terms Relating to Adhesives." Revised Aug. and Dec. 1964. pp. 274, 275, 280.
Eirich, Frederick R., Edt. "Rheology Theory and Applications." Vol. 3, New York, Academic Press, 1960, pp. 167–176, 193, 481–485.
Sharpe, Louis H. and Harold Schonhorn. "Surface Energetics, Adhesion, and Adhesion Joints." In Contact Angle, Wettability, and Adhesion: The Kendall Award Symposium Honoring William A. Zisman Sponsored by The Div. of Colloid and Surface Chemistry. 144th Meeting, Los Angeles, Calif., April 2–3, 1963, Washington, D.C., American Chemical Society, pp. 189–201. (Advances in Chemistry Series 43).
Encyclopedia of Polymer Science and Technology. Vol. 1, Sections: "Theory of Adhesive Joints," and "Adhesive Compositions." New York, Interscience, 1964, pp. 477–485.
Encyclopedia of Polymer Science and Technology. Vol. 12, Section: "Sizing". New York, Interscience, 1970, pp. 585–588.
Billmeyer, Fred W. "Textbook of Polymer Science." New York, Interscience, 1962, pp. 198–204.

*Primary Examiner*—Philip Anderson
*Attorney, Agent, or Firm*—J. J. O'Connell

[57] ABSTRACT

A low pressure process for preparing laminates by expanding the cross-section of a blank of thermoformable material between mold plates serving as skin laminae with the attendant formation of one or more voids having a partial vacuum or reduced pressure within the cross-section of such blank, which comprises venting the voids during the expansion of the cross-section so as to equilibrate the level of pressure within the voids with the level of pressure without the blank of thermoformable material so as to thereby regulate the uniformity and integrity of the resulting cross-sectional geometry of the expanded blank which serves as the core lamina of the resulting laminate.

Laminate products having an expanded cross-section are formed by such process.

24 Claims, 14 Drawing Figures

PROCESS FOR FORMING EXPANDED LAMINATES AND PRODUCTS

CROSS-REFERENCES TO RELATED PATENT APPLICATIONS

This patent application is a continuation-in-part of patent application Ser. No. 213,361 filed Dec. 29, 1971, now abandoned.

BACKGROUND OF THE INVENTION

1. Field of the Invention

This invention relates to the art of forming laminates from thermoformable materials.

2. Description of the Prior Art

Structural panels are used for many applications. For certain applications it is desired that the panel have both rigidity and structural strength and that it also be relatively light-weight. In order to provide such panels various techniques have been devised for providing a core of rigid material having a relatively low density between skins of material which have relatively high densities. Most of these techniques require the use of specific adhesives for the purpose of bonding the low density cores to the high density skin laminae. This adhesive bonding technique has many drawbacks. One such drawback lies in the fact that it is not always possible to find an adhesive which is capable of readily bonding the two materials which one would desire to place in a laminate of this type. In order to provide such adhesives for such different laminae, it is necessary in some cases to devise relatively expensive adhesives. Considerable time and effort moreover, is involved in utilizing some adhesives in the fabrication of the laminates. Many of these adhesives, for example, contain solvents. During the manufacture of the laminate with such adhesives it is necessary to provide a certain amount of time in which the solvent is allowed to evaporate from the adhesive before actual bonding occurs. This adhesive drying time tends to curtail the use of such solvent containing adhesives in applications which require the use of assembly line techniques in the fabrication of the laminates. It furthermore poses problems of solvent entrapment within the composite structure, which may lead to lower physical properties and odor problems.

Another drawback attendent upon the use of various types of adhesive relates to the use of adhesives which are of the curable type. These adhesives have a so-called "potlife" within which the adhesive must be used or it loses its utility. This potlife characteristic of the adhesive also tends to mitigate against the use of such adhesives for certain types of applications. The use of such adhesives also results in economic loss arising from the loss of adhesive which cannot be properly used during the potlife of such adhesives.

U.S. Pat. Nos. 2,502,304, 2,962,409 and 3,367,760 disclose processes for making laminates without the use of adhesives, but the laminates thus prepared have relatively little utility because of the relatively simple core geometries that can be produced using the process as disclosed in such patents.

SUMMARY OF THE INVENTION

Laminates are made from a thermoformable material which is expanded between skin laminae to provide a relatively lightweight core density having a variety of configurations and good physical properties in a relatively facile manner by expanding the cross-section of the thermoformable material between mold plates which also serve as skin laminae in such a way that one or more voids of reduced pressure are formed within the cross-section of the thermoformable material, and simultaneously venting the voids during the expansion of the cross-section of the material so as to equilibrate the pressure within the voids with the pressure without the thermoformable material so as to thereby regulate the uniformity and integrity of the resulting cross sectional geometry in the expanded material which serves as the core of the resulting laminate.

An object of the present invention is to provide laminates made from thermoformable materials and having an expanded cross-section.

A further object of the present invention is to provide rigid structural laminates having a variety of light-weight core constructions or geometries.

A further object of the present invention is to provide a process wherein laminates having lightweight expanded cores may be readily formed from thermoformable materials, using assembly line techniques, and without the use of adhesives.

Another object of the present invention is to form, without the use of adhesives, laminates having expanded core structures having regularly shaped voids therein of various geometric configurations and having enhanced rigidity properties provided by relatively large areas of discontinuous and/or continuous skin surface surface area of the core bonded to large areas of the skin laminae as an integral feature of the expanded structures.

Another object of the present invention is to provide, without the use of foaming or blowing agents, laminate structures having relatively large amounts of void spaces in the cores thereof.

DEFINITIONS

With respect to the herein provided description, examples and claims relating to the present invention the following definitions apply:

"Thermoformable" means that the thereby described material is a solid at 25°C. which can be reshaped or reformed above some higher temperature.

"Thermoplastic" means that the thereby described material is a solid at 25°C. which will soften or flow to a measurable degree above some higher temperature.

"Thermoset" means that the thereby described material is a solid at 25°C. which will not soften or flow, or cannot be reformed, at any higher temperature.

"Crystalline" means that the thereby described polymeric material exhibits a definite X-ray pattern for at least 50% of its polymeric structure when subjected to X-ray analysis.

"Amorphous" means that the thereby described polymeric material is devoid of a definite X-ray pattern for more than 50% of its polymeric structure when subjected to X-ray analysis.

"Ta" means the temperature at which a thermoplastic material exhibits hot tack adhesion.

"Tm" means, with respect to a crystalline polymer, the melting point of such polymer.

"Tg" means, with respect to an amorphous polymer, the temperature at which such polymer changes from a brittle to a rubbery condition. In a crystalline polymer it is the temperature at which the polymer becomes glassy.

"Plastic" means a natural or synthetic resin.

"Normally solid" means solid at 25°C.

"Wet" or "Wetting" means the relative ability of one material to achieve interfacial contact with another material.

"Hot tack adhesion" means the ability of one material to exhibit adhesion to a second material while the first material is in a molten state, above its Tm or Tg.

"Fusion point" means a temperature at which a material softens or melts.

"Cohesive Flow Property" means the property of a material in the molten state to be so readily distorted by external forces that the geometric cross-sectional area of such material will change substantially under such forces.

"Heat Distortion Point" means the temperature of a material as measured by ASTM D-648.

Most thermoformable materials have a Ta, i.e., a temperature at which they will exhibit hot tack adhesion to other materials. In the case of crystalline polymeric materials this Ta occurs about 5° to 10°C. above the Tm of such polymeric materials.

In the case of amorphous materials the Ta varies considerably, depending on the structure and molecular weight of the material. For the amorphous polymers, therefore, the Ta may be about 30° to 150°C. above the Tg of such polymers.

The Tm or Tg will also vary for a given polymeric backbone, depending on the molecular weight and density of the polymer.

The following is a listing of various polymeric materials which may be used in the present invention with a listing of their Tm or Tg, and their Ta, in °C. The Ta values reported here specifically relate to the Ta of the polymer when the polymer is being adhered to an aluminum substrate. The Ta value will be essentially the same for other substrates.

| | Polymer | Tg | Tm | Ta |
|---|---|---|---|---|
| 1. | polyethylene Density=0.96 M.I.=3–5 | — | 126 | 135–140 |
| 2. | polyethylene Density=0.94 M.I.=12–15 | — | 122 | 130–135 |
| 3. | polyethylene Density=0.924 M.I.=1.2 | — | 100–108 | 120 |
| 4. | polyvinyl chloride | > 5 | — | 155 |
| 5. | Nylon-6 | 60 | 215–220 | 240 |
| 6. | Nylon-6,6 | 65 | 260 | 270 |
| 7. | Polycaprolactone | — | 58 | 60 |
| 8. | Polyurethane (polyester) | — | 130–170 | 160–180 |
| 9. | Polysulfone | 185 | — | 300 |
| 10. | polypropylene | −5 to 0 | 165–170 | 170 |
| 11. | polycarbonate | 150 | — | 225 |
| 12. | polymethylmethacrylate | 90 | — | 160 |
| 13. | polystyrene | 100 | — | 185 |
| 14. | polystyrene (impact grade) | 100 | — | 180 |
| 15. | polyacetal | −60 | 165 | 170 |
| 16. | 90/10 mol % copolymer of polymethacrylonitrile & styrene | 115 | — | 240 |
| 17. | 70/30 mol % copolymer of polyvinyl alcohol and polyvinyl acetate | 50–60 | — | 120–130 |
| 18. | 94.2/5.7 mol % copolymer of ethylene and ethyl acrylate | −20 | — | 110 |
| 19. | 91.8/8.2 mol % copolymer of ethylene and acrylic acid | 18 | — | 110 |
| 20. | 82/18 wt. % copolymer of ethylene and vinyl acetate M.I.=2.3 | −15 | — | 120 |
| 21. | styrene-butadiene copolymer | 90 | — | 190 |
| 22. | styrene-acrylonitrile copolymer | 100 | — | 190 |
| 23. | hydroxy propyl cellulose | 100 | — | 110 |
| 24. | (solution blend of) polystyrene and polyphenylene oxide | 115–120 | — | 235 |
| 25. | cellulose acetate | 170 | — | 180–190 |
| 26. | acrylonitrile-butadiene styrene terpolymer | 100–104 | — | 180 |

It has now been found that the cross-section of a thermoformable material may be readily expanded so as to provide a large variety of laminates having a wide selection of expanded cross-sectional geometries in the cores thereof by expanding the cross-section of a blank of such thermoformable materials between mold plates serviceable as skin laminae so as to cause the concurrent formation of one or more voids of reduced pressure within the expanding cross-section of such blank, and venting the voids during the expansion of such cross-section so as to equilibrate the pressure within the voids with the pressure outside the blank and thereby regulate the uniformity and integrity of the resulting cross-sectional geometry of the expanded blank which serves as the core in the resulting laminate. The expansion of the blank is conducted while the blank is heated between the mold plates so as to place the thermoformable material in a thermoformable state, i.e., the blank is heated to a temperature which is ⩾ the fusion point of the thermoformable material. The thermoformable material is then expanded between a pair of separable mold plates, which mold plates are moved apart to effect the desired expansion of the blank of thermoformable material, while the blank is attached to the surface of such mold plates, in one way or another as disclosed below, during the expansion operation.

Figure 1:
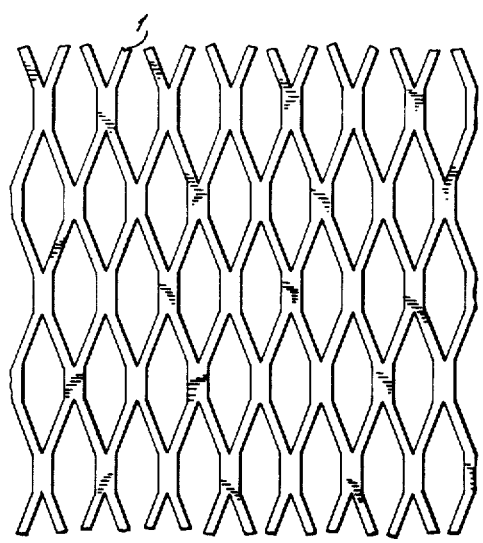
FIG. 1 shows a top view of a sheet of open mesh metal which may be used as a mold plate.

Thus, if a blank of thermoplastic polymeric material is placed between two mold plates in a heated press so that the temperature of the mold plates is about Ta or 5° to 10°C. above the Ta of the polymeric material in the blank, and the mold plates mechanically separated apart, the adhesive forces of the polymeric material to the surfaces of the mold plates are greater than the cohesive flow properties of the polymeric material itself during the plate separation or expansion step. As a result, it is possible to mechanically move the mold plates a certain distance apart with the polymeric material bonded to the surfaces thereof without causing a rupture of the adhesion between such surfaces and the fused material. With proper selection and/or treatment of the mold plates as described below, the mold plates will remain bonded to the fused plastic even after the fused and expanded plastic has been cooled to room temperature, and the adhering mold plates then serve as the skin laminae in the resulting laminates. The expanded plastic is the core lamina in the laminate. The mold plates which are to be used as such skin laminae in the resulting laminate must be removably mounted in the mold or press device in which the laminate is formed so that the mold plates can be removed from the press or mold with the core lamina bonded thereto.

Although the mass of the expanded fusible material does not change, the cross-sectional configuration of the fusible material is expanded in the direction of the two separated plates as a result of the adhesive force of attraction between the fused thermoformable material and the surfaces of the plates. The extent to which the cross-sectional area of the fused material can be so expanded is thus primarily determined by the strength of the adhesive bond between the fused material and the surfaces of the mold plates, and the extensibility, in the molten state, of the thermoplastic resin in the blank. The stronger is such adhesive bond, the greater is the amount of cohesive flow that can be induced in the molten resin without a rupture of the adhesive bond occurring. The strength of the bond will thus depend on the nature of the thermoplastic resin in the blank, the nature of the mold plate materials, the extent of the surface area of the mold plate which is in contact with the fused blank and the cohesive strength and flow properties of the polymeric plastic.

Thus, the use as mold plates of materials which are more readily wet by the fused plastic blank, will allow for a wider separation of the mold surfaces with the fused plastic bonded thereto, than would the use of mold plates made from materials which are not as readily wet by the fused blank. Also, the use of the blank in the form of continuous sheet material will allow for the wetting with the blank of a larger amount of the surface area of the faces of the mold plates and thus allow for the attainment of greater adhesive forces between the fused blank and the mold plates.

As the mold plates are pulled apart with the heated thermoformable material bonded thereto, voids of reduced pressure are formed within the body of the expanded plastic. Thus, although the mass of plastic does not change, the volume of the expanding cross-section of the plastic does increase. The frequency of the occurrence of these voids, as well as their size and shape, i.e., the pattern of the voids, is largely determined by the pattern of the points or areas of contact which exist between the surfaces of the mold plates and the expanding plastic during the expansion process. In order to maintain the desired pattern of the voids, it is necessary to vent the voids during the expansion step so as to equilibrate the pressure within the voids with the pressure without the expanding material.

The pattern of the points or areas of contact between the surfaces of the mold plates and the thermoplastic blank can be readily varied. For example, the contact surfaces of the mold plates and/or the blank can be provided with various designs of recessed or raised surfaces so that when the contact surfaces of the mold plates and the blank are brought face to face, only the raised surfaces of the mold plates and the blank will actually contact each other. Another procedure for providing a pattern of points of areas of contact would be to use mold plates and blanks whose contact surfaces are in the form of a mesh, lattice or net work type of configuration. Thus, only the strands of the mesh, lattice, or network are available for contact purposes. The open areas in the mesh, lattice or net-work configurations would not provide surface contact between the mold plates and the blanks. These various types of surface designs in the mold plates and/or the blanks could thus provide at least some areas of contact between the surfaces of the mold plates and the surfaces of the blank. For example, where the blank is in the form of a sheet of material having smooth and flat contact surfaces, some areas of contact between the surfaces of the blank and the mold plates could be provided by using mold plates which have raised contact surfaces so designed as to provide only such raised surface area for contacting the surfaces of the blanks, or by using mold plates which have mesh shaped contact faces. Conversely, where the mold plates have flat smooth surfaces, the blank could be provided with the same selective type of raised or meshed surface areas which would provide the desired pattern of contact surface area.

The desired pattern of contact areas can also be supplied to the contact surfaces of the mold plates and/or the blanks in another fashion. A negative of the desired pattern can be affixed to the contact surfaces of the blanks or the mold plates by the use of masking means, such as strips or panels of masking tape, kraft paper, "Mylar film" or other materials which will prevent the fused thermoplastic material from adhering to the surfaces of the mold plates. Thus, the fused plastic will only be allowed to adhere to the surfaces of the mold plates at those areas of contact between the surfaces of the mold plates and the blanks where there is no masking means present.

In other embodiments of the process of the present invention the entire surface areas of the contact surfaces of the blanks and of both of the mold plates can be used for providing the desired extent of the areas of contact between the contact surfaces of the mold plates and the blanks.

Thus it may be said that the cross-sectional geometry of the expanded blank is a function of the design of the areas of contact which is provided in the contact surfaces of the mold plates and/or the blanks. It is such design which determines the extent to which the surface areas of the mold plates and the blank are kept in contact during the expansion step in the process, and the extent of such contact areas is what determines the pattern of the voids in the expanding blank, and thus in the cross-sectional geometry of the expanded blank.

The voids created in the blank during the expansion step can be vented through one or both of the mold plates, or by the use of venting means inserted in the blank which is being expanded.

The speed with which the mold plates are moved apart during the expansion of the blank is not critical. The speed to be used is governed by the cohesive flow properties of the thermoformable material used in the fused blank. Where the blank is used in the form of sheets having thicknesses of the order of about 40 to 300 mils, such blanks may be expanded $\geq$ 2 to 20 times such thicknesses according to the present invention by expanding the fused blank at a rate of separation of the mold plates of about 10 to 150 mils per second.

After a desired separating distance has been achieved, the expanded blank is cooled, to a temperature below the heat distortion point of the plastic, the press is opened and the expanded blank is removed therefrom with one or both of the mold plates bonded thereto. Whether only one, or both, of the mold plates adheres to the cooled expanded blank depends on the nature of, and/or treatment of, the mold surfaces, and the nature of the polymeric materials, as will be discussed below.

The expanded blank is cooled to a temperature below its heat distortion point, before being removed from the press so as to freeze, so to speak, the configuration of the expanded blank, and thus prevent subsequent distortion of such configuration.

Thus, in the preferred embodiment of the process of the present invention the cross-section of the blank of thermoformable material having a Ta, which material is to serve as the core lamina in the resulting laminate, is expanded between a pair of mold plates, which mold plates are to serve as the skin laminae in the resulting blank, so as to provide a laminate having an expanded cross-sectional core geometry in the following sequence of steps:

the thermoformable material is inserted between the surfaces of a pair of mold plates while such thermoformable material is heated to a temperature which is $\geq$ Ta of such thermoformable material, the thus heated thermoformable material is then adhesively bonded by hot tack adhesion to the surfaces of each of the mold plates, the mold plates are then pulled apart, while the heated thermoformable material is thus adhesively bonded to the surfaces thereof, so as to expand the cross-section of the thermoformable material, and thereby effect within the expanding thermoformable material one or more voids of reduced pressure, the voids are vented during the pulling apart of the mold plates so as to equilibrate the pressure within the voids with the pressure without the blank and thereby preserve the pattern and the integrity of the voids in the resulting expanded cross-sectional geometry, and then the expanded thermoformable material is cooled to a temperature which is below the heat distortion point of such material.

The mold plates which are not to be removed from the cooled expanded thermoformable material must be disengageable from the device used to move them apart during the expansion step in the process described above. One of the mold plates can also be more permanently affixed to such device, in which case the cooled, expanded thermoformable material is then removed from the device with one mold plate affixed thereto.

When the expanded blank is cooled below its heat distortion point, or even below its Ta, Tm and/or Tg, it will not necessarily, in all cases, automatically lose its adhesion to the surfaces of the mold plates. The expanded blanks which are made of materials which are non polar in nature, such as the polyolefin resins, will generally readily lose their adhesion to the surfaces of all of the types of mold plates which may be used in the process of the present invention, and which are listed below in more detail. The expanded blanks which are made of polar materials, i.e., materials comprising compounds which possess an electric moment, such as polysulfone resins and resins containing carboxyl, hydroxyl and ester groups, will tend to remain bonded to the surfaces of most, if not all, of the mold plates which may be used in the process of the present invention. However, even where adhesion between the expanded blank and the mold plates is not automatically lost upon cooling the expanded blank, the cooled expanded blank, can, where desired, be mechanically stripped from the mold plates without disrupting the integrity or configurations of the expanded blank. The tendency of both the polar and non-polar types of materials, to continue to adhere to the mold plates after the expanded blank made therewith is cooled below its heat distortion point can be enhanced by using mold plates which have roughened contact surfaces. The rougher is such contact surface, the better will be the adhesive bond with the cooled plastic.

The thermoformable material must be heated to a fused or molten state during the expansion step.

A better understanding of the process of the present invention can be obtained from the process sequences illustrated in FIGS. 1 to 5 of the drawings.

FIG. 1 shows a top view of a type of mold plate 1 which may be used in the process of the present invention. Mold plate 1 is an expanded steel mesh with a diamond shaped metal pattern. The pattern of the steel mesh need not be diamond shaped, of course, it may have other open mesh configurations. It is the surfaces of metal mesh which provide the mold contact surfaces which will contact the blank of plastic.

Figure 2:
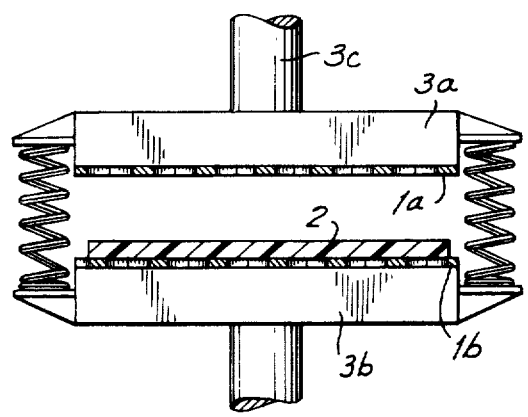
FIGS. 2–4 show a sequence of steps involved in increasing the cross-sectional area of a blank of thermoformable material according to one embodiment of the present invention using two sheets of metal mesh as shown in FIG. 1 as mold plates to form a laminate.
Figure 3:
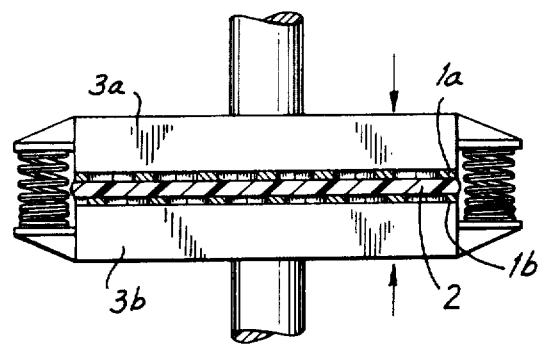
Figure 4:
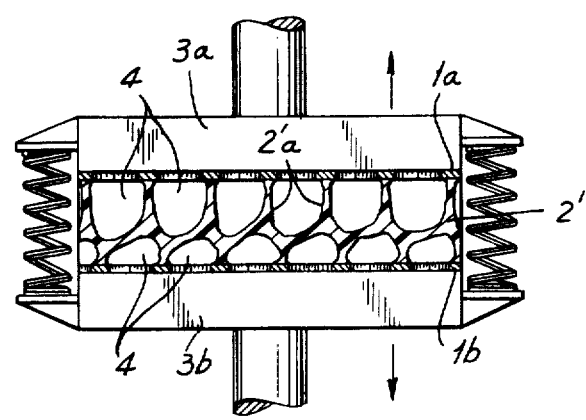

FIGS. 2 to 4 show a sequence of steps involved in using mold plate 1 according to one modification of the process of the present invention. In FIG. 2 there is shown a blank 2 of thermoformable material having a Ta, in the form of a smooth surfaced sheet of such material, which is inserted between the open platens, 3a and 3b, of a Carver press. To the faces of each of platen 3a and 3b of the press there is attached a metal mesh mold plate. In the embodiment shown, the contact points or areas of the top mold plate 1a are not vertically aligned with the contact points or areas of the lower mold plate 1b. In other embodiments such upper and lower contact points or areas can be vertically aligned. The mold plates 1 are heated, for the purposes of the present invention, to a temperature which is about Ta or 5° to 10°C. above the Ta of the blank 2. The mold plates may be heated before, preferably, or after the blank is inserted in the press, and they are preferably heated conductively through platens 3a and 3b.

The Carver press described herein is a 20 ton hand operated hydraulic ram 3c which actuates a movable 6 × 6 inch lower platen 3b again a fixed upper platen 3a. The platens are usually heated electrically. Although the Carver press is the preferred means for bringing the heated mold plates into contact with the blanks, according to the present invention, other suitable devices may be used, such as heated belts.

The process of the present invention may be conducted continuously or discontinuously. Using devices such as the Carver press, the process is readily conducted discontinuously. The process may be conducted continuously by feeding a continuous blank of thermoformable material between a pair of heated continuous belts of materials suitable as mold surfaces.

FIG. 3, shows the press after it has been closed with sufficient pressure to cause the top and bottom mold plates to exert a slight pressure on blank 2 so as to cause the heated blank to wet the surfaces of mold plates 1a and 1b which come in contact with the blank. The amount of pressure required for this step is of the order of about 1 ounce to 4 pounds per square inch. The pressure causes the blank to be slightly compressed.

FIG. 4 shows the platens pulled apart after the expansion step, with the expanded blank 2' adhering to points or areas of contact with plates 1a and 1b.

During the expansion step, as will be discussed in more detail below, areas of reduced pressure or cells 4 arise within the cross-section of the expanding blank. The side walls of the individual cells 4 are defined by rib-members 2'a of the expanded blank. The limits of cells 4 are defined by the contact points or areas of plates 1a and 1b and side walls 2'a. The reduced pressure in cells 4 is caused by the fact that each cell 4 tends to become a sealed chamber when the blank 2 fuses to the contact mold surfaces of plates 1a and 1b and, as the mold surfaces are pulled apart, the sealed cells 4 become enlarged, thus creating areas of reduced pressure. To prevent the higher ambient pressures from distorting or rupturing expanded walls 2'a of the blank cells 4 of the blank are vented during the expansion step so as to equilibrate the pressure within such cells 4 with the ambient pressure outside the blank. This venting tends to preserve the pattern and the integrity of the resulting cross-sectional geometry of the expanded blank. In this embodiment of the present invention, the venting is accomplished through the open mesh configuration of the mold plates and the imperfect seal that exists between the surfaces of platens 3a and 3b and mold plates 1a and 1b.

After the platens have been expanded the desired distance they are cooled to a temperature which is below the heat distortion point of the plastic in the blank. The cooling may be allowed to occur in the ambient air, or by circulating a cooling medium through the platens, or in some cases by a liquid coolant spray, or by conduction through cooled platens, or by a combination of such procedures.

The mold plate must be disengageable from the rest of the press where laminates are to be formed with the mold plate(s) as laminae thereof. In such case laminates may be readily formed with the disengageable mold plates as skin laminae and the expanded blank as a core lamina. When such laminates are desired, similar or dissimilar mold plates can be used so as to provide laminates with similar or dissimilar skin laminae, or even laminates wherein only one of the removable mold plates remains bonded to the cooled expanded blank.

Figure 5:
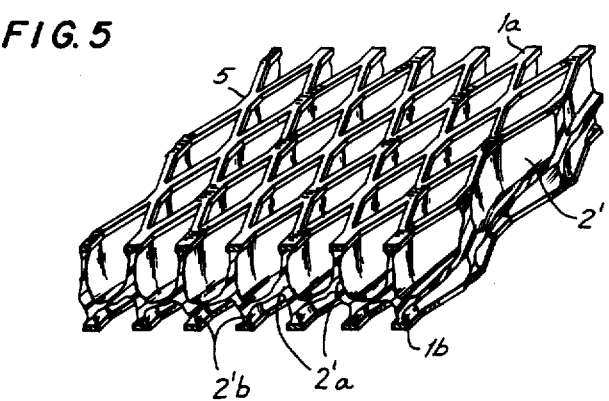
FIG. 5 shows a laminate structure made by the process disclosed in FIGS. 2–4.

FIG. 5 shows a cooled laminate structure 5 produced as described above with respect to FIGS. 1–4. The expanded and cooled plastic 2' remains bonded to plates 1a and 1b forming a rigid composite structural member 5. Rib members 2'a tend to have an I-beam configuration that has flanged members 2'b at the areas of contact with plates 1a and 1b. Expanded laminate structure 5 may be used as a relatively lightweight structural member as is. Also the expanded core member 2' can be used as a structural member with only one of metal plates 1a or 1b therewith.

For aesthetic, or other purposes, it may be desired to expand the cross-section of the blank in a non-uniform manner so as to provide laminates with expanded cores which have cross-sectional areas of various degrees of thickness.

Figure 6:
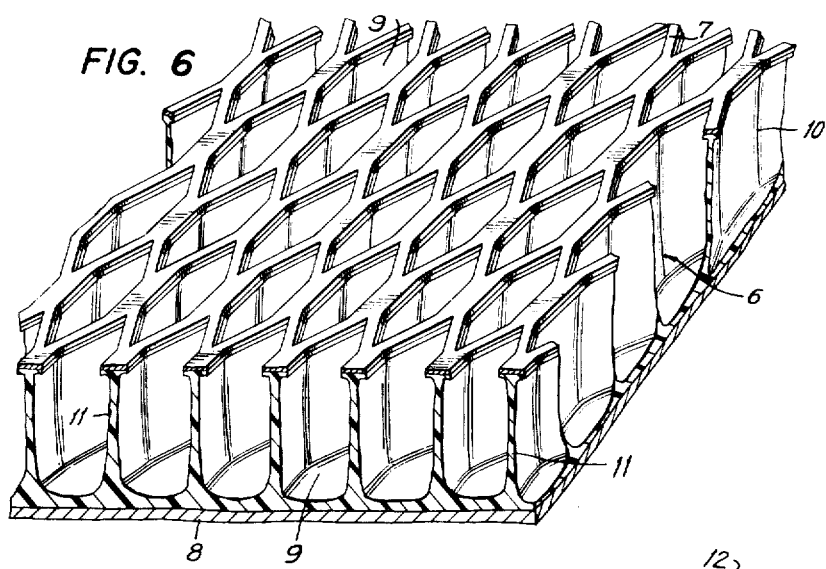
FIG. 6 shows another type of laminate that may be prepared using one of the mold plates of FIG. 1.

FIG. 6 discloses a further type of expanded laminate 6. The expanded laminate 6 shown in FIG. 6 was prepared from a solid sheet of plastic having a Ta. The sheet was expanded by hot tack adhesion, as described above, between a pair of molded plates. The upper mold plate 7 was a sheet of expanded metal similar to the sheet of metal mesh 1 shown in FIG. 1. The lower mold plate 8 was a smooth surfaced sheet of metal. The resulting voids 9 in the expanding plastic were vented through the openings in the face of mold plate 6 during the expansion step in the process. The resulting expanded core lamina 10 has a smooth continuous flat lower surface which is bonded to plate 8, and a top surface which replicates the pattern of the mesh at the contacting surface of the mold plate 7 and is bonded to plate 7 at the points of contact therewith. The rib members 11 of the expanded core lamina 10 have an I-beam configuration. For the most part, the rib members 11 which form common walls between voids 9, maintain their uniformity and integrity during the expansion step and are not punctured.

Figure 7:
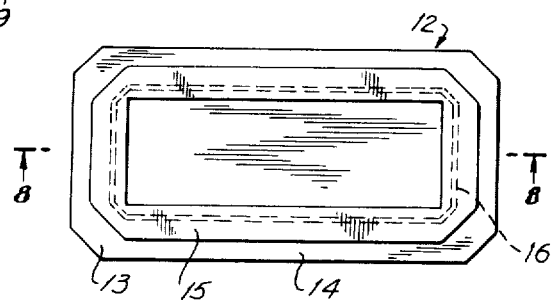
FIG. 7 shows a top view and FIG. 8 shows a cross-sectional view of another laminate made by the process of the present invention.
Figure 8:
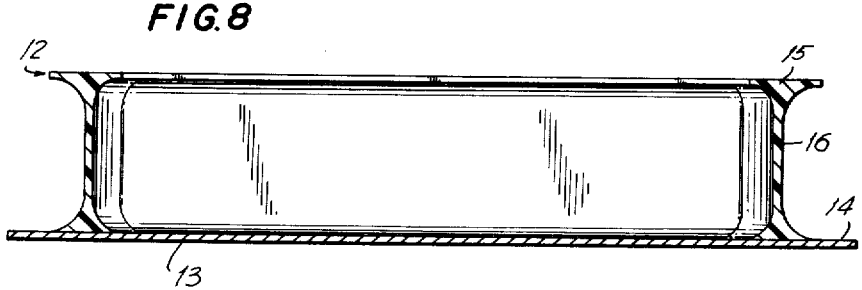

FIG. 7 shows a top view and FIG. 8 shows a cross-sectional view of a laminate 12 made by the process of the present invention. Laminate 12 consists of a base member 13, to one surface 14 of which there is laminated an expanded hollow, rectangular plastic member 15. Hollow member 15 is formed by continuous I-beam shaped wall member 16. Laminate 12 was formed by placing a thin punched out blank of plastic, which had the rectangular configuration of expanded member 15, on surface 14 of base member 13. Base member 13 was adhesively or mechanically affixed to the upper or lower platen of the Carver Press. To the other platen of the press there was affixed a flat mold plate having one or more vent holes punched therethrough. The hollow blank of plastic is positioned on base member 13 in the press so that one or more of the vent holes in the mold plate are adjacent the hollow portion of the blank during the expansion step. When the platens are then heated with the blank therebetween and close to slightly compress and fuse the plastic blank, the fused plastic adheres to the mold plate and the mold platen at the interfaces of the continuous web surfaces of the blank and the mold plate and the mold platen. When the press is then opened, the fused blank continues to adhere to the mold plate and mold platen, and is pulled apart or expanded to produce the expanded laminate 12 shown in FIGS. 7–8.

Figure 9:
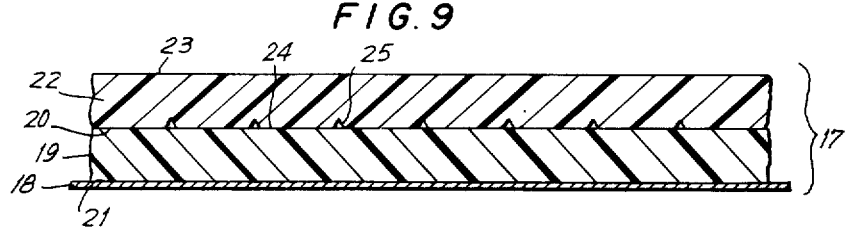
FIG. 9 shows a cross-section of a composite blank used in the process of the present invention.
Figure 11:
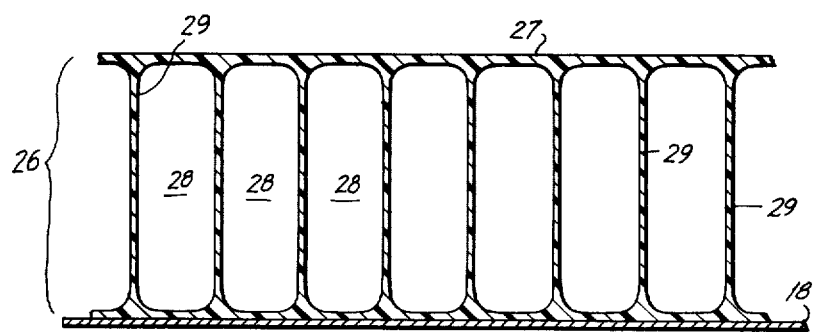

FIG. 9 shows a cross-sectional view of a composite blank 17 which was used to form the laminate 26 shown through the same cross-section in FIG. 11. Composite blank 17 consists of a continuous sheet or base member 18 on which there are sequentially positioned a continuous sheet 19 of resin having a smooth upper surface 20 and a smooth lower surface 21, and an upper sheet 22 of resin. The upper surface 23 of upper sheet 22 is smooth. The lower surface 24 of upper sheet 22 has a series of parallel, V-shaped grooves 25 therein which run the length of sheet 22. Prior to expanding blank 17, a masking means is applied to the surfaces of the V-shaped grooves 25. Sheet 19 is an optional component of blank 17. It is a sheet of resin which is used in some cases to promote the adhesion of the expandable sheet 22 of resin to base member 18 during the expansion step in the process.

Figure 10:
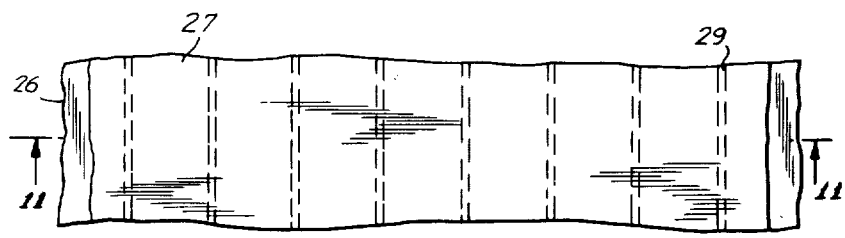
FIG. 10 shows a top view and FIG. 11 shows a cross-sectional view of a laminate made with the blank of FIG. 9.

FIG. 10 shows a top view, and FIG. 11 shows a cross-sectional view of laminate 26 which is made with blank 17 in the process of the present invention. Blank 17, with masking means in grooves 25, is expanded to form expanded laminate 26 between two continuous smooth surfaced platens in a Carver Press. The blank is inserted in the press so that base member 18 of blank 17 rests on the lower platen of the press. Base member 18 is adhesively or mechanically bonded to the lower platen of the press during the expansion step in the process. After the blank 17 is inserted in the press, the platens are closed to slightly compress blank 17, and fuse sheets 19 and 22. The top surface 23 of sheet 22 becomes continuously bonded by hot tack adhesion to the contact surface of the upper platen and the fused resin in sheet 19, when used, or the fused resin in sheet 22, causes base member 18 to be continuously bonded by hot tack adhesion to upper sheet 22, at the interface thereof, except at those strips of such interface which are adjacent the masked V-grooves 25 in sheet 22. The masking means prevents fusion or adhesion of sheet 22 where such masking means is present. During the expansion step upper surface 27 of laminate 26, which was surface 23 of blank 17, adhered to the contact surface of the upper mold plate. Cells 28 arise in the cross section of the expanding plastic during the expansion step. They are essentially rectangular in shape at the end of the expansion step, and are separated from each other by I-beam shaped wall members 29. Cells 28 and wall members 29 run the length of laminate 27. The cells 28 were vented out the ends thereof during the expansion step. Each cell 28 arose at the site of each masked V-groove 25.

Figure 12:
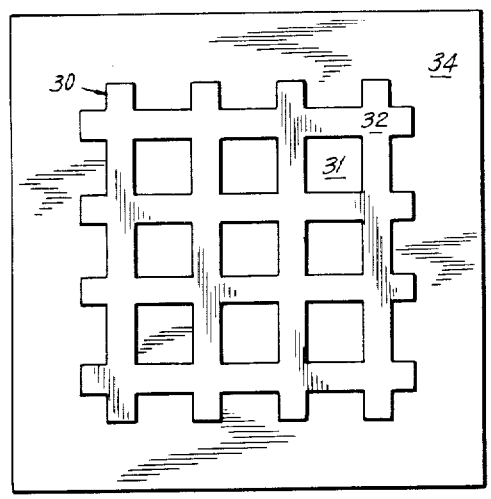
FIG. 12 shows a top view of a perforated blank that may be used in the process of the present invention.
Figure 13:
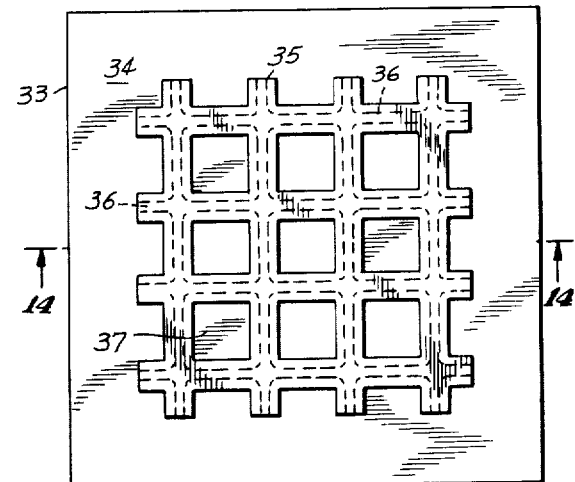
FIG. 13 shows a top view and FIG. 14 shows a cross-sectional view of a laminate made with the blank of FIG. 12. The preferred embodiment of the process of the present invention is based upon the property of various materials, and particularly thermoplastic polymeric materials, to exhibit hot-tack adhesion to practically all substrates at a temperature, Ta, which is usually above the Tg or Tm of the thermoplastic polymeric material. Thus, in a fused or molten state, the thermoplastic polymeric material will wet out practically all substrate surfaces and thereby impart adhesion thereto. In some cases this adhesion phenomena will be lost when the thermoplastic polymeric material cools below its Tm or Tg.
Figure 14:
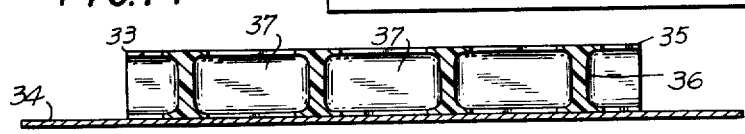

FIG. 12 shows a top view of a perforated plastic blank 30 that may be used to prepare the laminate 33 shown in FIGS. 13–14. Blank 30 was prepared from a sheet of plastic in which an ordered series of rectangular shaped perforations 31 were punched, as shown in FIG. 12. The perforations 31 are separated by web members 32 of the blank. The perforations can have other shapes, i.e., circular or triangular, and they can be arranged in other patterns, or be randomly distributed. Blank 30 rests on base 34.

FIG. 13 shows a top view, and FIG. 14 shows a cross sectional view of a laminate 33 that may be made by the process of the present invention with a perforated blank such as blank 30. Laminate 33 consists of a base member 34, to which is bonded an expanded plastic member 35. Plastic member 35 consists of an ordered network of I-beam shaped wall members 36 that have a lattice configuration formed by two parallel and intersecting sets of such wall members. One set of such wall members runs horizontally, and the other set runs vertically, across the face of base member 34. These two sets of wall members are co-planar, and form cells 37 therebetween. Laminate 33 is formed by expanding a blank 30 of plastic, while it is bonded to base member 34, in the process of the present invention. During the expansion process the lower surface of base member 34 is mechanically or adhesively affixed to the lower platen of the press, and the upper surface of plastic blank 30 is bonded by hot tack adhesion to the upper platen of the press. The mold platens are smooth surfaced. During the expansion step in the process the upper surfaces of web members 32 adhere to the contact surfaces of the upper platen of the press, while the lower surfaces of such web members 32 are bonded to the upper surface of base member 34. Cells 37 in laminate 33 arise at the site of perforations 31 during the expansion step and they are vented either through vent holes provided in the upper mold platen, or through base member 34, if base member 34 is porous, such as a sheet of cardboard. The upper and lower flanges of I-beam shaped wall members 32 provide a continuous lip member around the top and bottom opening of Cells 37. The bottom openings of cells 37, of course, are sealed by base member 34.

The amount of pressure used to pull the plates of the press apart in the process of the present invention is about 1 to 10 pounds per square inch of continuous surface area on the blank contact surface of the plates.

The laminates made in accordance with the present invention are lightweight panels that may be rigid or flexible depending on the plastic used therein, and the degree to which the plastic is expanded and the nature of the skin laminae. The laminates may be used, as structural elements for containers, walls, partitions, lath, packaging and other applications where lightweight structural elements are used.

THE THERMOFORMABLE MATERIALS

The materials which may be employed as the thermoformable blanks in the present invention are normally solid thermoformable materials which have a Ta of about 50° to 300°C., and preferably of about 100° to 250°C.

If there is a difference of at least about 10°C. between the melting points of any two fusible materials that could be used as the mold plates, then the fusible material having the lower melting point could be used as a blank while the fusible material having the higher melting point could be used as the mold plate.

The blanks may be used in various forms such as sheet, netting and sheet with punched out designs. The fusible material used for the blank need not have any elastomeric qualities.

Fusible materials which might be used as blanks would include natural and synthetic thermoplastic resins and thermosetting resins, glass and low melting elemental metals and alloys and compounds thereof.

The natural resins would include materials such as asphalt, bitumen, gums, pitch and tar.

The synthetic resins would include the vinyl resins. These vinyl resins may be either homopolymers of an individual vinyl monomer or they may be interpolymers of one or more vinyl monomer and from 0 to about 50 mol per cent of one or more non-vinyl monomers which are interpolymerizable with vinyl monomers. The term "vinyl monomer" means a compound which contains at least one polymerizable group of the formula

Such vinyl monomers, therefore, would include the following: unsubstituted olefins, including mono-olefins such as ethylene, propylene, 1-butene, and isobutylene and polyolefins such as butadiene, isoprene, dicyclopentadiene and norbornene; halogenated olefins such as chloroprene, tetrafluoroethylene, chlorotrifluoroethylene, hexafluoropropylene; vinyl aryls such as styrene, o-methoxystyrene, p-methoxystyrene, m-methoxystyrene, o-nitrostyrene, p-nitrostyrene, o-methylstyrene, p-methylstyrene, m-methylstyrene, p-phenylstyrene, o-phenylstyrene, m-phenylstyrene, vinylnaphthalene and the like; vinyl and vinylidene halides, such as vinyl chloride, vinyl fluoride, vinylidene chloride, vinylidene fluoride, vinylidene bromide and the like; vinyl esters such as vinyl formate, vinyl acetate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl esters and ketones such as vinyl methyl ether, vinyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbozole, N-vinyl pyrollidone, ethyl methylene malonate, acrolein, vinyl alcohol, vinyl acetal, vinyl butyral and the like. Non-vinyl monomers which may be interpolymerizable with vinyl monomers include carbon monoxide and formaldehyde.

The vinyl polymers would thus include, for example, polyethylene, polypropylene, ethylene-propylene copolymers, polyvinyl chloride, polyvinylidene chloride, polyvinyl fluoride, polystyrene, styrene-butadieneacrylonitrile terpolymers, ethylene-vinyl-acetate copolymers, ethylene-acrylic acid copolymers, ethylene-acrylonitrile copolymers and styrene-acrylonitrile copolymers.

In addition to the vinyl polymers, other polymeric materials which may be used in accordance with the present invention include thermoplastic polyurethane resins; polyamide resins, such as the nylon resins, including polyhexamethylene adipamide; polysulfone resins; polycarbonate resins; phenoxy resins; polyacetal resins; polyalkylene oxide resins such as polyethylene oxide and polypropylene oxide; polyphenylene oxide resins; and cellulose ester resins such as cellulose nitrate, cellulose acetate and cellulose propionate.

Also included within the term "polymer" are blends of two or more polymeric materials. Illustrative of such blends are polyethylene/polypropylene; low density polyethylene/high density polyethylene; polyethylene with olefin interpolymers such as those indicated above, for example, ethylene-acrylic acid copolymers, ethylene-ethyl methacrylate copolymers, ethylene-ethylacrylate copolymers, ethylene-vinyl-acetate copolymers, ethylene-acrylic acid-ethyl-acrylate terpolymers, ethylene-acrylic acid-vinyl-acetate terpolymers, and the like.

Also included within the term polymer are the metallic salts of those polymers or blends thereof which contain free carboxylic acid groups. Illustrative of such polymers are ethylene-methacrylic acid copolymers, ethylene-ethacrylic acid copolymers, styrene-acrylic acid copolymers, buteneacrylic acid copolymers, and the like.

Illustrative of the metals which may be used to provide the salts of such carboxylic acid polymers are the 1, 2 and 3 valent metals such as sodium, lithium, potassium, calcium, magnesium, aluminum, barium, zinc, zirconium, beryllium, iron, nickel, cobalt, and the like.

The polymers from which the blanks are shaped may be used in any of the forms in which they are commonly employed in the molding arts such as in the form of powder, pellets, granules and the like, and blends of the same with one or more adjuvant materials. Such adjuvant materials would include materials such as plasticizers, heat and light stabilizers, fillers, pigments, processing acids, extenders, fibrous reinforcing agents, impact improvers and metal, carbon and glass fibers and particles.

The particular polymeric material being used would dictate the selection and quantity of the adjuvants to be employed therewith, since it is the respective adjuvants for such polymers that are employed in the present invention. The adjuvants employed must be physically and chemically compatible with each of the other components of the compositions under the described operating conditions. The adjuvants are used in amounts which will be effective for the intended purpose. Thus, for example, the effective amount of plasticizer is a "plasticizing amount", that is, an amount of plasticizer which will appreciably increase the flexibility, processability, workability and/or distensibility of the polymer. The stabilizers would be used in a stabilizingly effective quantity, and the fillers would be used in effective quantities therefor, as for example, if a reinforcing filler is to be used then the filler would be used in such amounts as to provide the desired reinforcing effect.

The polymer based compositions employed in the present invention may be prepared by any of the commonly employed techniques employed for compounding such compositions. Such procedures would include techniques such as dry blending or hot compounding, as well as with or without the use of mixing equipment such as ribbon blenders, muller blenders, intensive mixer blenders, extruders, banbury mixers and the like.

Although metallic materials of construction are usually only used as the mold plates in the process of the present invention, it is possible that laminates of the present invention can also be made wherein a low melting metal, or alloy or compound thereof, can be used as the core lamina, with mold plates made, as skin laminae, from non-fusible materials, or materials having higher fusion points than such low melting metallic materials.

Some rigid polymeric materials such as polysulfone resins, polycarbonate resins, and certain vinyl resins such as polyvinyl chloride, tend to develop internal stresses and associated frozen-in-strains when press formed into blanks. When such stresses and strains are present, it is not possible to readily use the blanks in the process of the present invention unless the blanks are first annealed to relax such stresses and strains in the blank. This annealing can be accomplished in about 0.5 to 240 minutes at temperatures ranging from the heat distortion temperature to the melting point of the resin, as disclosed in U.S. patent application Ser. No. 213,432 filed Dec. 29, 1971 in the names of W. H. Smarook and John Sonia and now abandoned.

Where the compositions used for the thermoformable blank contain fillers, the expansion temperature may have to be increased 5° to 20°C. to compensate for the increased viscosity of the resulting compositions.

THE MOLD PLATES

The two mold plates used to pull the blank apart and to serve as the skin laminae in the resulting laminate can be made of the same or different materials. The mold plates may have continuous or perforated surfaces, they may also be porous of non-porous, planar or non-planar and matching.

During the molding operation it is desirable as noted above, to vent the interior portions of the blanks which are being pulled apart. The need for venting the blanks being expanded, as noted above, arises due to the fact that a vacuum is created within the interior sections of the blank by virtue of the increase of the volume of such interior portions during the expansion operation. If the blank is not vented during the expansion operation, atmospheric pressure could cause puncture of the extended rib sections of the expanded blank during the expansion operation. This venting of the expanded blank can also be accomplished by using perforated or porous mold plates.

The materials from which the mold plates may be fabricated are normally solid materials which are either not fusible at the operating temperatures or which have a melting point which is at least 10°C. higher than the melting point of the fusible material from which the blank is fabricated.

Non-fusible materials which may be used for the mold plates would include cellulosic materials such as wood, paper, cardboard and compressed sawdust; thermoset or vulcanized compositions based on natural or synthetic resins; minerals such as graphite, clay and quartz; natural rock and stone minerals such as marble and slate; building materials such as brick, tile, wallboard and concrete; and proteinaceous materials such as leather and hides.

Fusible materials having a relatively high Tg or Tm which could be used as the mold plates would include metals such as aluminum, iron, lead, nickel, magnesium, copper, silver and tin, as well as alloys and compounds of such metals, such as steel, brass and bronze; vitreous materials such as glass, ceramics and porcelain; and thermoplastic resins having a relatively very high fusion point, such as the so called engineering plastics, such as polytetrafluoroethylene, nylon-6 resins, polyacetal resins, polyvinylidene fluoride, polyesters and polyvinyl fluoride; or fusible materials coated with polytetrafluoroethylene.

In some cases it may be necessary to improve the adhesion of the thermoformable materials to one or more of the substrates to which they are to be laminated. Certain compounds can be used as adhesion promoters for such purposes. The preferred of these adhesion promoters are various organosilicon compounds. These adhesion promoters may be used as primers and applied to the surfaces of the laminae substrates in layers which are at least monomolecular in depth. The adhesion promoters may also be incorporated or admixed in with the components of the expandable blank. In the latter case, the adhesion promoter is added to the blank in an amount of about 0.00001 to 5.0 per cent by weight based on the weight of the blank.

When the organo-silicon compound is to be used as a primer or incorporated into the blank, it may be used in the form of a solution in an organic solvent such as an alcohol, an ester, a ketone, an aromatic or aliphatic hydrocarbon, a halogenated hydrocarbon, or mixtures of such solvents.

Examples of the organo-silicon compounds which may be used include silyl peroxide compounds, alkoxy silanes, amino-alkoxy silanes, vinyl alkoxy silanes and amino-alkylalkoxy silanes.

The silyl peroxide compounds may be in the form of a monomer or polymer, e.g., silane or siloxane. They may in fact, be any silicon-containing compound which contains an organo-peroxy group bonded to silicon, which organo moiety is bonded to the peroxy oxygen and thence to be silicon by a non-carbonyl carbon atom.

These silyl peroxides can be made pursuant to the processes described in U.S. Pat. No. 3,631,161 and Canadian Pat. No. 924,230.

Specific examples of such silyl peroxide compounds are vinyl tris(t-butylperoxy)silane, allyl tris(t-butylperoxy)silane, tetratris(t-butylperoxy)silane, allyl(t-butylperoxy)tetrasiloxane, vinyl methyl bis(t-butylperoxy)silane, vinyl tris($\alpha$, $\alpha$-dimethylbenzylperoxy)silane, allyl methyl bis(t-butylperoxy)silane, methyl tris(t-butylperoxy)silane, dimethyl bis(t-butylperoxy)silane, isocyanatopropyl tris(t-butylperoxy)silane and vinyl diacetoxy(t-butylperoxy)silane.

The amino alkyl alkoxy silanes would include those having the structure:

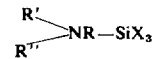

wherein X is alkoxy, aroxy or acryloxy; R is divalent alkylene of 3–8 carbon atoms with at least 3 sequential carbon atoms separating N from Si; at least one of R' and R'' is hydrogen, and any remaining R' or R'' is alkyl, $HO\text{-}[CH_2CH_2(O)_x\text{-}]_{1\text{-}5}$ were $x$ is 0 or 1, $H_2NCO-$, $H_2NCH_2CH_2-$, and $H_2NCH_2CH_2NHCH_2CH_2-$.

Examples of such aminoalkyl-alkoxy silanes would include gamma-aminopropyltriethoxy silane, gamma-aminopropyltriethoxy silane, bis beta-hydroxy methyl)gammaaminopropyltriethoxy silane and N-beta-(aminoethyl) gamma-aminopropyltriethoxy silane.

As noted above, one of the plates which are used to adhere to, and pull and expand the blank of plastic, may be an integral part of the press platens or molding device. The mold plates which are to remain laminated to the expanded core lamina, however, must be removably mountable on the platen or molding device. The use of the removable type of mold plate is also desirable where the mold plates are to be perforated or porous, so as to effect the venting therethrough.

The following examples are merely illustrative of the present invention and are not intended as a limitation upon the scope thereof.

The press used in these examples was a spring loaded Carver press, as shown in FIGS. 2 to 4 of the drawings. Two springs were used in the press and each had a deflection of 130 pounds per inch, and the springs were designed to mechanically pull the platens apart, as explained above with reference to FIGS. 2 to 4, at a predetermined rate, as regulated by a needle valve on the hydraulic ram of the press. The platens of the press were malleable cast iron and could be cooled by conduction, as desired, by the circulation of cold water therethrough. The platens of the press could also be heated by conduction, as desired, by heating platens 3a and 3b electrically. The temperature of the surfaces of the heated platens and mold plates was measured with a thermocoupled pyrometer.

EXAMPLE 1

A 52 mil thick expanded steel mesh, as shown in FIG. 1, was mechanically fastened to each of the platens of a Carver press. The diamond shaped pattern of the mesh had ⅝ by 1 inch openings with a 115 mil face width for the flat metal mesh strand. A 6 × 6 inch smooth surfaced sheet of polyethylene (having a density of 0.96, a melt index of 3; a Tm of 130–140°C. and a Ta of about 135°–140°C.) which was 120 mils thick was coated with a solution, in toluene, of a silyl peroxide adhesion promoter, vinyl tris(t-butylperoxy) silane, on both surfaces of the sheet so as to provide such surfaces, after the evaporation of the toluene, with a coating of about 2 milligrams of the silyl peroxide per square inch of surface area. The thus coated sheet was placed in the press, as shown in FIG. 2, after the mesh platens had been heated to a temperature of 185°C. The platens of the press were then closed so as to subject the blank (the peroxide coated sheet) to a pressure of 10 psi, as shown in FIG. 3. The polymer in the blank fused and wet and adhered to the steel mesh mold plates. The temperature throughout the mold plates and the platens of the press were allowed to equlibrate and the temperature thereof dropped to 135°C. Then the mold plates were separated, as shown in FIG. 4, at a velocity of 1000 mils/15 seconds, and then cooled to about 125°C. Venting of the blank was done through the mesh of the mold plates and between the contacting surfaces of the platens of the press and the mesh plates. The normal contacting surfaces of the platens of the press and the mesh plates were rough enough so as to allow sufficient venting therebetween.

The expanded sheet, with the mesh plates adhered thereto, was removed from the press. The resulting composite structure, shown in FIG. 5, was ¾ inch thick. The rib members of the expanded core of plastic were regularly spaced and firmly bonded to the mesh plates. A portion of the mesh surface of the composite, about 1 inch in diameter, was subject to a blow of 150 foot pounds which deformed the mesh plates and the expanded core, but did not cause adhesive delamination of the expanded core from the mesh plates. The resultant laminate was a structural core embodying two mesh skins suitable for an automobile dashboard or other portions thereof.

EXAMPLE 2

The procedure of Example 1 was followed except that the blank used was a sheet of a blend of polysulfone and silicone block copolymer. The sheet had a Tg of 180°C. and a Ta of about 300°C. The surfaces of the metal mesh plates that were to contact the blank were primed with a 5% solution of polysulfone in methylene chloride (as an adhesion promoter) and dried for 10 minutes at 275°C. prior to fastening the plates to the platens of the press.

The blank was fused between the mold plates in the press, at 375°C. was expanded at 340°C. When cooled and removed from the press the expanded blank was firmly bonded to both of the mesh plates. The expanded composite was about 1 inch thick and had regular spaced ribbing as shown in FIG. 5. This composite expanded laminate could be used as a structural member in furniture frames, interior automotive framing and the like.

EXAMPLE 3

A 6 inch × 6 inch × 120 mil sheet of the polyethylene of Example 1, was expanded between two different surfaces to produce the composite shown in FIG. 6 of the drawings. The top mold 7 was a sheet of the expanded metal mesh used as the mold surface in Example 1. The lower mold surface 8 was a smooth surfaced solid sheet of carbon steel 32 mils in thickness. Each of mold surfaces 7 and 8 were removably mounted in the Carver press. The two contacting surfaces of the sheet of plastic were treated with a silyl peroxide adhesion promoter as in Example 1. The sheet of plastic was then expanded as in Example 1 so as to provide an expanded composite which was ⅞ inch thick and had the configuration of the composite shown in FIG. 6. Venting of the voids 9 that appeared in the upper portion of the expanding core lamina 6 during the expansion step in the process was accomplished through the perforations in the face of plate 7 and through the interface between perforated mold surfaces of expanded metal mesh 7 and the upper platen of the Carver press. The rib members 11 of the expanded core of plastic had an I-beam configuration.

EXAMPLE 4

A laminate was prepared as shown in FIGS. 7–8. A continuous 5/16 inch wide webbing in the form of a hollow rectangle having outside dimensions of 3⅝× 1½ inch was punched out of a 65 mil thick sheet of ethylene-ethyl acrylate copolymer having a Ta of 110°C. The base member 13 was a 5 mil thick sheet of aluminum which was backed, on the back of surface 14, with a continuous 50 mil sheet of the same ethylene-ethyl acrylate copolymer. This continuous sheet of ethylene-ethyl acrylate polymer was used to bond, by hot tack adhesion, the back surface of base member 13 to the upper platen of the press during the expansion step.

The vented mold plate which was used on the lower platen of the press, was a flat ⅛ inch thick sheet of aluminum having randomly spaced 40 mil vent holes drilled there through. The platens and lower mold plate were heated to 150°C and the back surface of base member 13 was bonded by hot tack adhesion to the contact surface of upper platen of the press, then the hollow plastic blank was bonded on one of its rectangular sides to surface 14 of base member 14 by hot tack adhesion and the press was closed to bond the other side of the blank, by hot tack adhesion, to the lower mold plate. The temperature of the press then equilibrated at 140°C. and the press was opened at the rate of 10 mils/second to expand the resin to a height of five-eighth inch. When cooled to room temperature the laminate was readily stripped from the upper platen and the lower mold plate. The layer of resin on the back side of base member 15 remained bonded to the back side of base member 13, and when removed therefrom, the resulting laminate product had the configuration of laminate 12 shown in FIGS. 7–8. The expanded plastic member 15 was very flexible and essentially transparent, and well bonded to the base member 13. It was useful as a shipping container or display case.

EXAMPLE 5

This Example discloses the preparation of a laminate as shown in FIGS. 10–11. A 10 mil thick sheet of aluminum was coated on the upper face thereof with a 10 mil thick coating of an ethylene-acrylic acid copolymer having an acrylic acid content of 18%, a melt index of 50 and a Ta of about 110°C. The lower face of the aluminum sheet was coated with a 5 mil thick coating of polyethylene having a Ta of about 120°C. The coated aluminum sheet was inserted in a Carver Press heated to 140°C with the polyethylene coated face of the sheet resting on the lower platen of the press. The polyethylene fused and was used as an adhesive to bond the aluminum to the lower platen of the press during the expansion step in the process. A 125 mil thick sheet of ethylene-ethyl acrylate copolymer having a Ta of 110°C was usd as upper sheet 22 as shown in FIG. 9. This sheet of resin had a series of parallel V-shaped grooves in the lower face thereof. The grooves were spaced three-eighths inch apart, wer 50 mils deep, and had a 60° angle between the sides thereof. Powdered clay was dusted in these grooves as a masking means. The grooved surface of upper sheet 22 was placed in contact with the coating of ethylene-ethyl acrylate resin on the aluminum sheet. The press was then closed and the composite blank was slightly compressed to fuse all the layers of resin, and to cause upper sheet 22 to become bonded to aluminum sheet 18. The temperature of the press was allowed to equilibrate at about 120°C and then the press was opened at the rate of 15 mils/second to expand the composite blank to an expanded height of three-fourths inch. When cooled, the expanded laminate was readily removed from the platens of the press and had the configuration shown in FIGS. 10–11. The polyethylene adhesion promoter was readily stripped from the lower surface of the aluminum sheet. The layers of ethylene-acrylic acid copolymer and ethylene-ethyl acrylate copolymer fused together at the interfaces thereof, except along interface of the marked V-grooves. The cells 28 which arose during the expansion step along the side of the V-grooves were vented out the ends thereof. The laminate was useful as a reinforced structural panel.

EXAMPLE 6

A 6 inch × 6 inch × 100 mil thick sheet of thermoplastic polyester polyurethane having a Ta of 160°–180°C was first bonded to a flat 40 mil thick sheet of aluminum with the aid of a silane adhesion promoter and then expanded expanded between two different mold surfaces to produce a composite somewhat like the one shown in FIG. 6 of the drawings. The silane adhesion promoter was used as a primer on the aluminum, and was gamma-glycidoxypropyl trimethoxy silane. The top mold plate was a 6 inch × 6 inch × ⅛ inch sheet of aluminum which had a pattern of ¾ inch holes punched therein. The holes were spaced three-sixteenths inch apart and were aligned in staggered rows and columns. This top mold was mechanically affixed to the face of the upper mold platen of the press. The lower mold surface was a 6 × 6 inch smooth surfaced, 40 mil thick, solid sheet of chrome steel. The upper and lower surfaces of this solid chrome sheet was coated with 10 mils of polyethylene (density 0.92) having a Ta of 110°C. The polyethylene acted as an adhesion promoter, between the solid aluminum sheet and the lower chrome sheet platen of the press, during the expansion process. The sheet of polyurethane was inserted in the press when the mold surfaces were at a temperature of about 205°C, and the press was then closed to slightly compress the plastic and cause it to fuse and adhere to the two mold plates. The press was opened at 185°C so as to expand the polyurethane plastic at a rate of 15 mils/second to an expanded height of about five-eighths inch. After cooling and removal from the press the expanded polyurethane remained bonded to the solid sheet of aluminum. This composite laminate readily separated from the cooled mold plates. The expanded laminate had a structure similar to that shown in FIG. 6, except that the cells in the polyurethane were hexagonal in shape, and the continuous lip member around the opening of each cell formed a circle. This pattern of circular openings replicated the pattern of circular perforations which were present in the upper mold plate used to make the laminate. The cells that arose during the expansion of the polyurethane were vented through the perforations in the upper mold plate and the imperfect seal that exists between such mold plate and the upper platen of the press. The expanded plastic in the laminate was highly flexible. The laminate was useful as a structural panel that afforded rigidity on the aluminum panel side, and a cushioning member, on the urethane side.

EXAMPLE 7

A laminate as shown in FIGS. 13–14 was prepared. A series of aligned columns and rows of one-fourth × one-fourth square perforations were punched in a 6 × 6 × 60 mil sheet polyethylene having a density of 0.96, a melt index of 0.2 and a Ta of 135–140°C. The perforations were spaced one-fourth inch apart from each other and had the pattern shown in FIG. 12. The perforated sheet of plastic was laid on top of a 30 mil thick sheet of chip board type cardboard. The lower surface of the cardboard was coated with a 4 mil thick coating of low density polyethylene having a density of 0.92 and a Ta of 110°–120°C. This composite was inserted between the smooth surfaced platens of a Carver Press heated to 160°C. The press was closed to compress the blank and cause the two resins to fuse. The low density polyethylene fused and bonded the cardboard to the lower platen. The high density polyethylene fused and bonded to the upper surface of the cardboard and the lower surface of the upper platen. The press was then expanded at 140°C at the rate of 25 mils/second to expand the laminate to a height of 250 mils. Upon cooling the two polyethylene resins separated from the mold platens and remained bonded to the cardboard. The low density polyethylene layer could be stripped from the bottom of the cardboard. The resulting laminate had a structure as shown in FIGS. 13–14. The expanded plastic was rigid. The laminate could be used as a oil trap in the base of a package designed to transport foods fried in oil.

EXAMPLE 8

A laminate was made as in Example 7, except that the pattern of square perforations was made in a 6 inches × 6 inches × 40 mil sheet of ethylene-vinyl acetate copolymer having a Ta of 120°C. The composite blank was inserted in the press at 160°C and expanded at 140°C. to an expanded thickness of nine-sixteenths inch. The resulting laminate had a resilient expanded plastic member. It was shock absorbent and useful for packaging fragile articles.

EXAMPLE 9

A laminate was made as in Example 7 except that the pattern of square perforations was made in a 6 inches × 6 inches × 60 mil sheet of thermoplastic polyester polyurethane having a Ta of 160°–180°C., and the base member 34 was a 6 inches × 6 inches × 10 mil sheet of aluminum. A 4 mil coating of polyethylene (density 0.92) having a Ta of 110°C. was used on the lower surface of the aluminum sheet to bond it to the lower mold platen during the expansion step. A 10 mil coating of ethylene-acrylic acid copolymer having a To of 110°C. was used on the upper surface of (0.92) the aluminum sheet to promote adhesion between the aluminum sheet and the polyurethane.

The resulting composite was inserted in the press at 190°C and expanded at the rate of 15 mils/second at 170°C to expand to urethane to a final thickness of 0.260 inch. The resulting cooled composite could be cut or folded to provide shipping pads or containers which had a shock absorbent urethane member.

Various polymeric resins used as the expandable blanks tend to pick up moisture when exposed to the atmosphere, i.e., about 0.05 to 5.0 weight %. This moisture is preferably removed from the plastic before inserting the plastic in the hot press so as to avoid blistering or bubbling in the heated plastic. The plastics which are more susceptible to this type of moisture absorption are the polycarbonate resins, polymethymethacrylate resins, nylon resins, cellulose acetate resins, acrylonitrile-butadiene-styrene terpolymer resins, hydroxy propyl cellulose resins, styrene-acrylonitrile copolymer resins and phenoxy resins.

The upper mold plate used in Example 7 through 9 was a smooth aluminum plate ⅛ inch thick through which 40 mil holes were drilled to provide venting therethrough during the expansion step.

For practical purposes the process of the present invention is preferably conducted under ambient conditions of pressure, i.e. atmospheric pressure. The areas, cells or voids of reduced pressure that are formed within the expanding blank during the expansion step in the process have partial vacuums therein. Thus, the level of pressure in the voids is below that of the higher level of ambient atmospheric pressure. The venting of the void areas during the expansion step is to allow these two levels of pressure to be equilibrated so as to otherwise avoid rupturing of the cell walls existing between the void areas. The partial vacuums are created in the voids areas within the blank during the expansion step in the process of the present invention because the volume of the void or cell is created and expanded within a body of plastic whose interior has no access to the ambient atmosphere other than through the venting means. The difference between the level of ambient pressure and the level of reduced pressure existing under the partial vacuum conditions in the void areas is sufficient, in the absence of such venting, to rupture the relatively thin walls of expanded thermoformable material that separate the cells of reduced pressure from each other.

The blanks are uniformly heated prior to the beginning of the expansion step in the process. This can be accomplished by heating the blanks before or after they are inserted between the platens. Where the blanks are relatively thin, i.e., of the order of ≤ 150 mils, they can be readily heated, to the Ta of the thermoformable material therein, between the heated platens. The length of time needed to accomplish this will vary depending on the thickness of the blank, the Ta value, and the thermal conductivity and heat capacity of the thermoformable material, and the amount of contact that exists between the surfaces of the blank and the surfaces of the platen(s). This heating can be accomplished by contact with one or both of the platens.

Where the blanks are thicker than about 150 mils, and/or have relatively high Ta values, and/or will have relatively little contact with the platen surfaces, they can also be heated to a temperature which is, for crystalline materials, about 20°C. below the Tm of such materials, and for amorphous materials, about 20°C below the Ta of the amorphous material, before the blank is inserted between the platens, and then the blanks can be heated to the Ta of the thermoformable material by being heated by contact with the platens and/or by other heating procedures such as by infrared radiation.

The cooling of the expanded blank is conducted so as to solidify or freeze, so to speak, the expanded article in its expanded configuration. This is done by cooling the article below its heat distortion point. This does not necessarily require a quenching, or quick cooling operation, unless the expanded thermoformable material is very fluid and/or has relatively thick wall members. Otherwise the cooling can be performed, in most cases, by merely exposing the expanded article to ambient air at about 25°–30°C., i.e., room temperature and/or by cooling the mold surfaces with a cooling medium, such as cold water, that is circulated through the interior of the mold plates. In some cases the cooling can also be hastened by spraying the expanded article with a spray of cool water or other cooling gas or liquid.

The Ta values for a thermoformable material which are reported above were found to be, approximately, the lowest temperatures at which the related thermoformable material could be used in the process of the present invention. The reported Ta values were found, initially, by a trial-and-error technique in which a heated sheet of the thermoformable material (6 inches × 6 inches × 100 mils) was placed between continuous sheets of aluminum (6 inches × 6 inches × 100 mils) so as to ascertain, empirically, by trial-and-error, the minimum temperature at which the process of the present invention could be conducted. The reported Ta value was thus the minimum temperature at which the thermoformable material would adhere to the sheet of aluminum with sufficient force so that mechanical work applied to the molten thermoformable material, in the form of the pulling of the two sheets of aluminum apart, produced a viscous flow in the thermoformable material without loss of adhesion to the aluminum plates, as the plates were pulled apart to a height of at least 12 times its original thickness.

These same minimum Ta values, as determined with aluminum mold plates, were also found to be the same (within about ±1°-2°C.) for the respective thermoformable materials when the mold plates were also made of other metals such as steel and brass, and the other conditions were the same.

Subsequent to the initial trial-and-error procedures that were used, as described above, to determine the above reported minimum Ta values for the various listed thermoformable materials, a more rigorous experimental approach was used to ascertain the minimum Ta values for such thermoformable materials. In this procedure an Instron Tensile Strength Tester was used to evaluate each thermoformable material to ascertain its minimum Ta values. The Instron instrument comprised a heated set of metal discs of known cross-sectional areas (0.994 in$^2$) which were thermostatically controlled and housed in a sealable chamber having pyrex windows in the walls thereof for observation purposes. A 100 mil thick disc sample (0.994 in$^2$) of the thermoformable material was then inserted between the metal discs which were heated near the previously (empirically) determined Ta value for such material. The instrument was then subjected to a compressive load of 2 psi for 5 seconds to allow the thermoformable material to be fused by the metal discs and to wet the discs with such material. The instrument was then subjected to a tensile loading at a crosshead speed of 2 inches per minute to determine the minimum temperature at which the thermoformable material was fluid enough to be pulled apart while still adhering to the discs. The tensile loadings required to accomplish this vary from thermoformable material to thermoformable material but were in the range of about 6 to 10 psi of tensile force for the synthetic resins whose (minimum) Ta values are reported above.

It was found that the minimum Ta values, when the thermoformable materials were tested in the Instron tensile tester as noted above, were within ±1°-2°C. of the minimum Ta values which had been previously found for such materials in the initial trial-and-error procedures. These minimum Ta values were also within about ±1°-2°C. for each of such thermoformable materials regardless of whether the metal used in the metal discs of the Instron tensile tester was aluminum, cold rolled steel, hot rolled steel, zinc plated steel or brass. The same results are also obtained when the metal disc was coated with a baked on coating of a dispersion grade of polytetrafluoroethylene. Polytetrafluoroethylene is not useful, however, as a thermoformable material in the process of the present invention since it does not melt with a useful Ta value.

These test results thus provide the basis for the Ta values reported above for each of the listed thermoformable materials. These reported Ta values, however, are the minimum temperatures at which the related thermoformable materials can be employed in the process of the present invention. The useful range of Ta values for a particular thermoformable material, with respect to its utility in the process of the present invention, will vary from thermoformable material to thermoformable material. Each thermoformable material has its own peculiar viscosity properties at elevated temperatures i.e., above its minimum Ta value. To be useful in the process of the present invention, at temperatures above its minimum Ta, the thermoformable material must be viscous enough to withstand the force of gravity and not sag between the mold plates during the separation of the mold plates. The useful range of Ta values, therefore, is that wherein the thermoformable material retains its adhesion to the mold plates and at which its melt viscosity is low enough to afford melt flow or extensibility, but at which it is not so fluid, or have such a low degree of viscosity, as to sag under the influence of the forces of gravity. Every material that can be melted usually becomes more fluid, or less viscous, as the temperature of the melt is increased. To be useful in the process of the present invention the thermoformable material cannot be heated so high above its minimum Ta value as to become so fluid in its expanded condition that it has more tendency to sag during the molding cycle under the influence of gravity than to retain its expanded configuration.

As a practical matter as the blank is separated between the hot mold plates, those portions of the expanded blank that are in the cross-section of the expanded blank, and are not in direct contact with the heated mold plates, tend to cool faster and become more viscous, than those portions of the blank that remain in contact with the mold plates.

In the case of crystalline thermoformable materials the useful range of Ta values is relatively narrow, and, in the case of some such materials the useful range of Ta values may only be 5° to 10°C. above the Tm of such materials. In the case of amorphous thermoformable materials the useful range of Ta values is usually broader.

It is to be noted also, that, in the case of polymeric thermoformable materials, the Ta values of polymeric materials made from the same monomers will vary depending on the molecular weight of the polymer. The Ta values for such polymers will usually be proportionally higher as the molecular weight of the polymer is increased.

The speed with which the blank of thermoformable material can be expanded between the mold plates within the useful range of Ta values will also depend on several factors such as the viscosity of the thermoformable material at the Ta value employed, the mass and shape of the thermoformable material, the amount of area of contact between the surface of the mold plates and the surfaces of the blank, and the complexity of the cross-sectional geometry of the expanded article.

What is claimed is:

1. A process for preparing a laminate from a thermoformable material having a Ta and a pair of mold plates having a Ta higher than that of said thermoformable material which comprises positioning said thermoformable material between said mold plates while said thermoformable material is heated to a temperature which is ≥ the Ta of said thermoformable material and at which temperature said thermoformable material is in a thermoformable state adhesively bonding said thermoformable material by hot tack adhesion to said mold plates pulling said mold plates apart, while said thermoformable material is thus adhesively bonded thereto and is in said thermoformable state, so as to thereby expand the cross section of said thermoformable material and effect within said expanding thermoformable material one or more voids having a partial vacuum therein, venting said voids during said pulling apart so as to equilibrate the lower level of pressure within said voids with the higher level of ambient pressure without said thermoformable material and thereby regulate the uniformity and integrity of the geometry of the resulting expanded cross section of said thermoformable material, and cooling the expanded thermoformable material to a temperature below the heat distortion point of said thermoformable material, so as to thereby form a laminate of the expanded thermoformable material with at least one of said mold plates.

2. A process as in claim 1 in which said thermoformable material comprises thermoplastic material.

3. A process as in claim 2 in which said thermoplastic material comprises synthetic resin.

4. A process as in claim 3 in which said synthetic resin comprises vinyl resin.

5. A process as in claim 4 in which said vinyl resin comprises ethylene polymer resin.

6. A process as in claim 5 in which said ethylene polymer resin is a homopolymer.

7. A process as in claim 5 in which said ethylene polymer resin is a copolymer.

8. A process as in claim 7 in which said copolymer is a copolymer of ethylene and ethyl acrylate.

9. A process as in claim 7 in which said copolymer is a copolymer of ethylene and vinyl acetate.

10. A process as in claim 3 in which said synthetic resin comprises urethane resin.

11. A process as in claim 3 in which said synthetic resin comprises polysulfone resin.

12. A process as in claim 3 in which said synthetic resin comprises silicone resin.

13. A process as in claim 3 in which at least one of said mold plates comprises metal.

14. A process as in claim 13 in both of said mold plates comprise metal.

15. A process as in claim 13 in which said metal comprises iron.

16. A process as in claim 13 in which said metal comprises aluminum.

17. A process as in claim 4 in which at least one of said mold plates comprises cellulosic material.

18. A process as in claim 17 in which said cellulosic material comprises cardboard.

19. A process as in claim 1 in which said venting is accomplished through at least one of said mold plates.

20. A process as in claim 19 in which said venting is accomplished through both of said mold plates.

21. A process as in claim 1 in which said venting is accomplished through said thermoformable material.

22. A laminate product of the process of claim 1.

23. A process as in claim 1 in which a laminate is formed from said expanded thermoformable material and one of said mold plates.

24. A process as in claim 1 in which a laminate is formed from said expanded thermoformable material and both of said mold plates.

* * * * *

UNITED STATES PATENT OFFICE
CERTIFICATE OF CORRECTION

Patent No. 3,919,445  Dated November 11, 1975

Inventor(s) Walter H. Smarook

It is certified that error appears in the above-identified patent and that said Letters Patent are hereby corrected as shown below:

Column 9, line 9, "6" should read --6 inch--.

Column 10, line 30, "molded" should read --mold--.

Column 13, line 47, "carbozole" should read --carbazole--.

Column 14, line 14, "polymer" should read --"polymer"--.

Column 14, line 33, "acids" should read --aids--.

Column 15, line 27, "of" should read --or--.

Column 16, line 30, "be" should read --the--.

Column 16, line 59, "gamma-aminopropyltriethoxy silane" should be deleted.

Column 17, line 28, "3/8" should read --3/8 inch--.

Column 17, line 29, first occurrence, "6" should read -- 6 inch --.

Column 18, line 49, "3 5/8" should read --3 5/8 inch--.

Column 19, line 32, "usd" should read --used--.

Column 19, line 35, "wer" should read --were--.

UNITED STATES PATENT OFFICE
CERTIFICATE OF CORRECTION

Patent No. 3,919,445          Dated November 11, 1975

Inventor(s) Walter H. Smarook

It is certified that error appears in the above-identified patent and that said Letters Patent are hereby corrected as shown below:

Column 19, line 65, "expanded", first occurrence, should be deleted.

Column 20, line 8, "6" should read --6 inch--.

Column 20, lines 44-45, "one-fourth x one-fourth" should read --1/4 inch x 1/4 inch--.

Column 20, line 45, "6 x 6" should read --6 inch x 6 inch--.

Column 21, line 26, "To" should read --Ta--.

Column 21, line 27, "0.92)" should be deleted.

Column 21, line 43, "polymethymethacrylate" should read --polymethylmethacrylate--.

Signed and Sealed this

Tenth Day of August 1976

[SEAL]

Attest:

RUTH C. MASON
Attesting Officer

C. MARSHALL DANN
Commissioner of Patents and Trademarks